(12) United States Patent
Marupaduga et al.

(10) Patent No.: US 9,065,498 B1
(45) Date of Patent: Jun. 23, 2015

(54) DYNAMIC ASSIGNMENT OF MIMO MODES FOR A WIRELESS COMMUNICATION DEVICE

(71) Applicant: Sprint Communications Company L.P., Overland Park, KS (US)

(72) Inventors: Sreekar Marupaduga, Overland Park, KS (US); Muralidhar Reddy Malreddy, Overland Park, KS (US); Andrew Mark Wurtenberger, Olathe, KS (US); Nicholas David Kullman, Vashon, WA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/049,428

(22) Filed: Oct. 9, 2013

(51) Int. Cl.
*H04K 1/10* (2006.01)
*H04L 27/28* (2006.01)
*H04B 7/04* (2006.01)

(52) U.S. Cl.
CPC .................................. *H04B 7/0413* (2013.01)

(58) Field of Classification Search
CPC ...... H04B 7/0413; H04B 7/04; H04B 7/0404; H04B 7/0408
USPC ......... 375/260, 284, 285, 346, 267, 299, 347, 375/349; 370/330, 436; 455/500, 501, 504, 455/505, 506
See application file for complete search history.

(56) References Cited

U.S. PATENT DOCUMENTS

| | | | |
|---|---|---|---|
| 7,801,238 B2 | 9/2010 | Borst et al. | |
| 8,248,993 B2 | 8/2012 | Cai | |
| 2009/0156227 A1* | 6/2009 | Frerking et al. | 455/455 |
| 2009/0252251 A1 | 10/2009 | Tosato et al. | |

FOREIGN PATENT DOCUMENTS

| | | |
|---|---|---|
| EP | 1777837 | 4/2007 |
| EP | 2057760 | 2/2008 |
| EP | 2143212 | 10/2008 |
| WO | 2008023315 | 2/2008 |
| WO | 2008121283 | 10/2008 |

* cited by examiner

*Primary Examiner* — Phuong Phu

(57) ABSTRACT

A wireless access node to facilitate dynamic assignment of multiple-input multiple-output (MIMO) modes comprises a wireless communication transceiver and a processing system. The wireless communication transceiver is configured to receive a scattering coefficient transmitted from a wireless communication device served by the wireless access node. The processing system is configured to compare the scattering coefficient to a scattering threshold, and if the scattering coefficient exceeds the scattering threshold, select a lower order MIMO mode for the wireless communication device and assign the lower order MIMO mode to the wireless communication device.

14 Claims, 5 Drawing Sheets

DYNAMIC ASSIGNMENT OF MIMO MODES FOR A WIRELESS COMMUNICATION DEVICE

TECHNICAL BACKGROUND

Modern wireless communication protocols may use multiple-input and multiple-output (MIMO) transmission schemes when transferring communications to wireless communication devices. MIMO uses multiple antennas for each carrier in a wireless access node in order to improve communication transfer performance. The improvements in communication transfer performance may include increased wireless range and data throughput. Some examples of MIMO wireless protocols include Worldwide Interoperability for Microwave Access (WiMAX), Long Term Evolution (LTE), and the latest 802.11n wireless protocols (Wi-Fi).

A key factor in the proper implementation of a MIMO communication system is scattering, since higher degrees of scattering enable increased de-correlation of the signals at the receiver, which is necessary for MIMO to function properly. Typically, rich scattering in MIMO propagation environments is required for the channel capacity to scale linearly with the number of antennas. The MIMO mode utilized for communications has an impact on the effective cell radius of the base station. Higher order MIMO modes require a reduction in power per symbol when compared to lower order MIMO modes. The reduction in power per symbol required for higher order MIMO modes, such as eight by eight MIMO, requires a reduction in power per symbol which in turn reduces the effective cell radius of the serving base station. The effectively smaller cell radius of higher order MIMO modes can lead to a degraded user experience for those who are not within range of the smaller coverage area provided by these modes.

Overview

A method of operating a wireless access node to facilitate dynamic assignment of multiple-input multiple-output (MIMO) modes is disclosed. The method comprises receiving a scattering coefficient transmitted from a wireless communication device served by the wireless access node. The method further comprises comparing the scattering coefficient to a scattering threshold. The method further comprises, if the scattering coefficient exceeds the scattering threshold, selecting a lower order MIMO mode for the wireless communication device. The method further comprises assigning the lower order MIMO mode to the wireless communication device.

A wireless access node to facilitate dynamic assignment of multiple-input multiple-output (MIMO) modes comprises a wireless communication transceiver and a processing system. The wireless communication transceiver is configured to receive a scattering coefficient transmitted from a wireless communication device served by the wireless access node. The processing system is configured to compare the scattering coefficient to a scattering threshold, and if the scattering coefficient exceeds the scattering threshold, select a lower order MIMO mode for the wireless communication device and assign the lower order MIMO mode to the wireless communication device.

A computer apparatus to facilitate dynamic assignment of multiple-input multiple-output (MIMO) modes comprises software instructions and at least one non-transitory computer-readable storage medium storing the software instructions. The software instructions are configured, when executed by a wireless access node, to direct the wireless access node to receive a scattering coefficient transmitted from a wireless communication device served by the wireless access node. The software instructions are further configured to direct the wireless access node to compare the scattering coefficient to a scattering threshold, and if the scattering coefficient exceeds the scattering threshold, select a lower order MIMO mode for the wireless communication device and assign the lower order MIMO mode to the wireless communication device.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
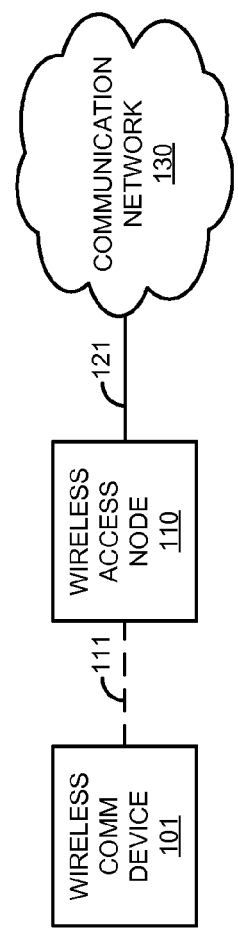
FIG. 1 is a block diagram that illustrates a communication system.

FIG. 1 is a block diagram that illustrates communication system 100. Communication system 100 includes wireless communication device 101, wireless access node 110, and communication network 130. Wireless communication device 101 and wireless access node 110 are in communication over wireless communication link 111. Wireless access node 110 and communication network 130 communicate over communication link 121.

Figure 2:
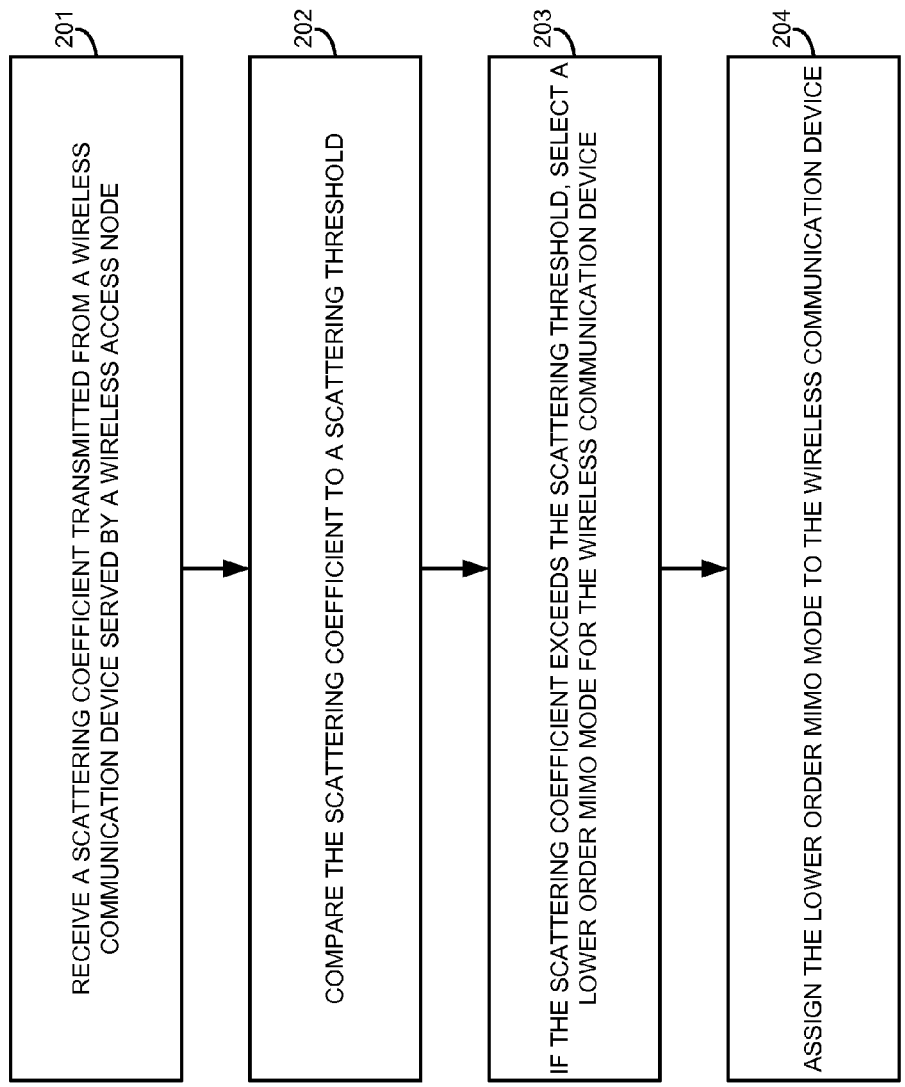
FIG. 2 is a flow diagram that illustrates an operation of the communication system.

FIG. 2 is a flow diagram that illustrates an operation of communication system 100. The steps of the operation are indicated below parenthetically. The operation of communication system 100 shown in FIG. 2 may be employed to facilitate the dynamic assignment of multiple-input multiple-output (MIMO) modes for a wireless communication device. The operation could be performed by wireless access node 110 or some other data processing system of communication network 130, and the processing could be distributed among these and/or other network elements in some examples.

To begin, wireless access node 110 receives a scattering coefficient transmitted from wireless communication device 101 served by wireless access node 110 (201). The scattering coefficient typically provides a metric for how much scattering wireless communication device 101 detects at its present location. For example, the scattering coefficient could represent the degree of scattering where wireless communication device 101 is located. Typically, wireless communication device 101 could scan and detect the scattering coefficient at its present location and transmit this information to wireless access node 110, although the scattering coefficient could be determined differently in some examples, including being determined by wireless access node 110 and/or other network elements of communication network 130. Wireless communication device 101 could be configured to transmit the scattering coefficient in a variety of ways, including periodically or on a predetermined schedule, whenever wireless communication device 101 moves to a new location, in response to a request for the scattering coefficient, or according to any other scheme—including combinations thereof.

Wireless access node 110 compares the scattering coefficient to a scattering threshold (202). The scattering threshold could be set to any value that may be compared to the scattering coefficient. Wireless access node 110 compares the scattering coefficient to the scattering threshold to determine a MIMO mode for wireless communication device 101. For example, a particular MIMO mode may be selected by wireless access node 110 depending on whether or not the scattering coefficient exceeds the scattering threshold. In some examples, multiple scattering thresholds could be employed in a tiered approach, with different MIMO modes associated with the different thresholds.

If the scattering coefficient exceeds the scattering threshold, wireless access node 110 selects a lower order MIMO mode for wireless communication device 101 (203). The lower order MIMO mode could be predetermined or could be selected dynamically by wireless access node 110 in some examples. Typically, the lower order MIMO mode comprises fewer MIMO channels, such as one by one or two by two MIMO modes, but any MIMO mode could be selected by wireless access node 110 when the scattering coefficient exceeds the scattering threshold. In some examples, if the scattering coefficient falls below the scattering threshold, wireless access node 110 selects a MIMO mode for wireless communication device 101 based on a channel quality indicator. It should be noted that implementation decisions and/or threshold value selection may dictate the behavior in the case of the scattering coefficient equaling the scattering threshold. For example, wireless access node 110 could select one type of MIMO mode for wireless communication device 101 if the scattering coefficient equals or exceeds the scattering threshold in some examples, but could select a different MIMO mode if the scattering coefficient equals or falls below the scattering threshold in other examples. Other design choices to implement the above techniques are also possible and within the scope of this disclosure.

Wireless access node 110 assigns the lower order MIMO mode to wireless communication device 101 (204). Typically, wireless access node 110 informs wireless communication device 101 of the new MIMO mode assignment and begins communicating with device 101 using the selected MIMO mode. In some examples, after assigning the lower order MIMO mode, wireless access node 110 could receive a new scattering coefficient transmitted from wireless communication device 101. In such cases, if the new scattering coefficient falls below the scattering threshold, wireless access node 110 could assign a higher order MIMO mode to wireless communication device 101. For example, if wireless communication device 101 was initially assigned a two by two MIMO mode, the higher order MIMO mode assigned by wireless access node 110 could comprise a four by four MIMO mode. In some examples, the higher order MIMO mode could be assigned by wireless access node 110 at least partly based on a channel quality indicator.

Advantageously, wireless access node 110 selects and assigns a MIMO mode for wireless communication device 101 based on scattering information received from the device. When the level of scattering observed by wireless communication device 101 is high enough to exceed a threshold, a lower order MIMO mode is selected. Wireless communication device 101 and wireless access node 110 may then communicate using the selected MIMO mode. By selecting a lower order MIMO mode, the power per symbol is consequently increased, allowing for an expansion of the effective cell radius, thereby providing access to more users.

Referring back to FIG. 1, wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNodeB), and others—including combinations thereof. Wireless network protocols that may be utilized by wireless access node 110 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof.

Communication network 130 comprises the core network of a wireless communication service provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

Wireless communication link 111 uses the air or space as the transport medium. Wireless communication link 111 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication link 121 uses metal, air, space, optical fiber such as glass or plastic, or some other material as the transport medium—including combinations thereof. Communication link 121 could use various communication protocols, such as TDM, IP, Ethernet, telephony, optical networking, hybrid fiber coax (HFC), communication signaling, wireless protocols, or some other communication format—including combinations thereof. Communication link 121 may be a direct link or could include intermediate networks, systems, or devices.

Figure 3:
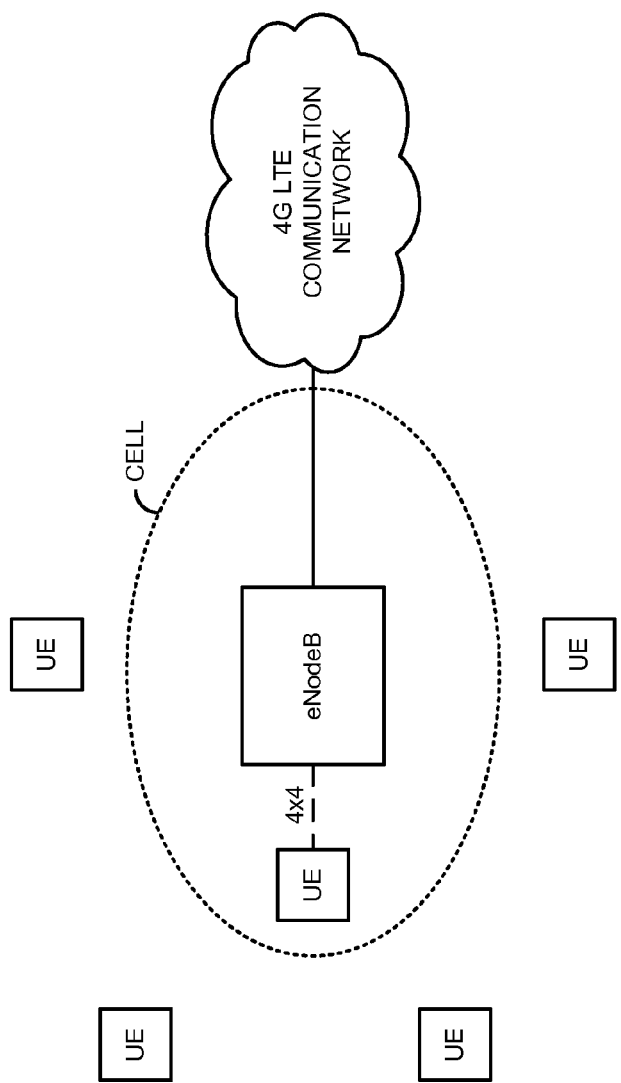
FIG. 3 is a block diagram that illustrates a communication system in an exemplary embodiment.

FIG. 3 is a block diagram that illustrates long term evolution (LTE) communication system 300 in an exemplary embodiment. LTE communication system 300 includes an enhanced Node B (eNodeB) base station that is in communication with the 4G LTE communication network. 4G LTE communication network could include a mobility management entity (MME), serving gateway (SGW), packet data network gateway (PGW), and other network elements typically found in a 4G LTE communication network. The eNodeB has a wireless coverage area with an approximate boundary as indicated by the dotted line encircling the eNodeB, which is typically defined by its signal propagation characteristics and coverage capabilities. In this example, the dotted line encircling the eNodeB represents a cell coverage area provided by the eNodeB using a four by four MIMO mode, as shown by the "4×4" designation on FIG. 3. The eNodeB provides an example of wireless access node 110, although node 110 may use alternative configurations. LTE communication system 300 also includes several user equipment (UE) devices, one of which is shown in the same cell sector served by the eNodeB. The cell surrounding the eNodeB could be referred to as a serving cell for the UE located within it.

Figure 4:
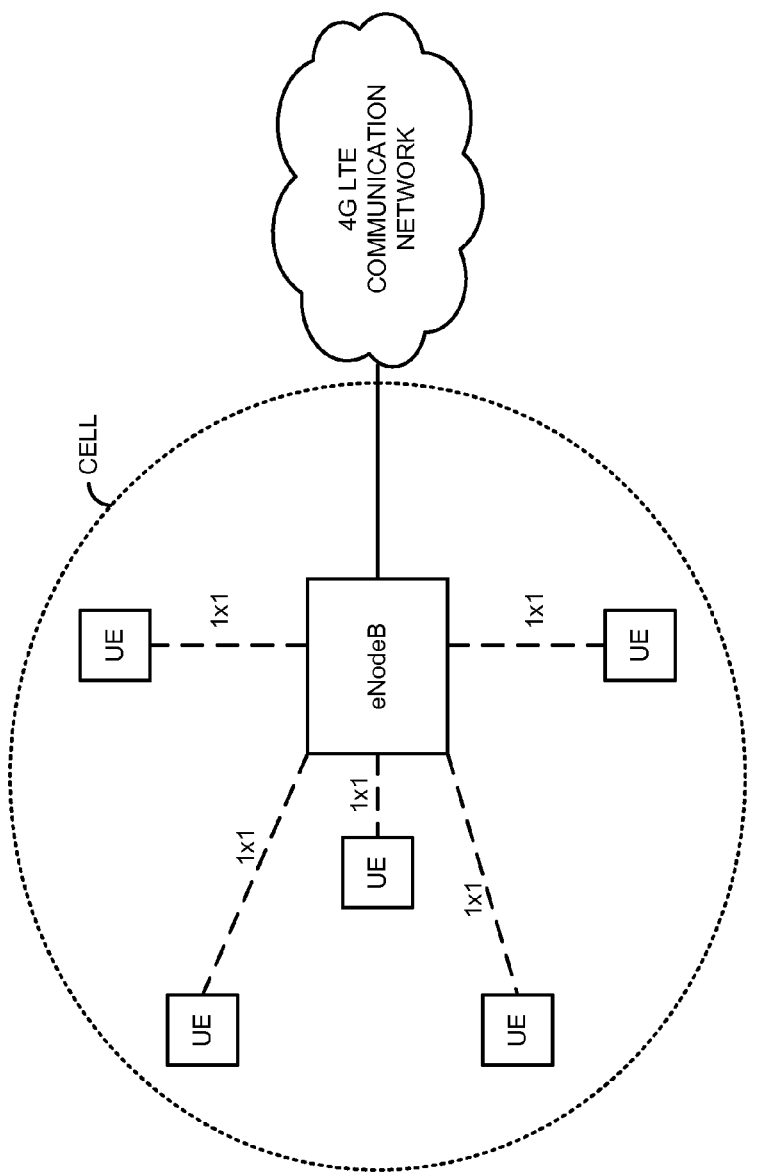
FIG. 4 is a block diagram that illustrates a communication system in an exemplary embodiment.

In operation, the UE initially communicates with the eNodeB using a four by four MIMO mode. At some point during the exchange of these communications, the UE scans the area and detects the amount of scattering present at its current location. The UE then sends this information to the eNodeB in the form of a scattering coefficient. The eNodeB compares the scattering coefficient to a scattering threshold to determine if the level of scattering is high enough to allow for a reduction in the MIMO mode. On the contrary, if the scattering coefficient falls below the threshold indicating a lower degree of scattering at the UE, the standard MIMO assignment scheme should still be used, which is based on channel quality indicators. However, in this example, the scattering coefficient does exceed the scattering threshold, so a lower order MIMO mode may be selected by the eNodeB. FIG. 4 provides an example of how selecting a lower order one by one MIMO mode increases the effective cell radius provided by the eNodeB.

FIG. 4 is a block diagram that illustrates long term evolution (LTE) communication system 400 in an exemplary embodiment. LTE communication system 400 is identical to LTE communication system 300 of FIG. 3 except that the eNodeB has selected a one by one MIMO mode for communication with the surrounding UE devices.

As can be seen by comparing the size of the cell provided by the eNodeB shown in FIG. 3 to the size of the cell provided by the eNodeB of FIG. 4, the effective cell radius has greatly increased by reducing the MIMO mode from four by four MIMO to the lower order one by one MIMO mode for the UE. The effective cell radius has increased as a result of higher power per symbol when using the one by one MIMO mode as compared with the higher order four by four mode, since higher order MIMO modes require a reduction in power per symbol when compared to lower order modes. By increasing the effective cell radius, the eNodeB is able to serve a greater number of UE devices. In this example, four additional UE devices are able to receive service from the eNodeB using the one by one MIMO mode instead of the four by four MIMO mode shown in FIG. 3, thereby increasing the user experience for these users who are now able to receive service. Note that in areas of high cell density where there are large numbers of users located near the eNodeB, the standard procedure of MIMO assignment using channel quality indicators should be used in order to eliminate inter-cell interference.

Figure 5:
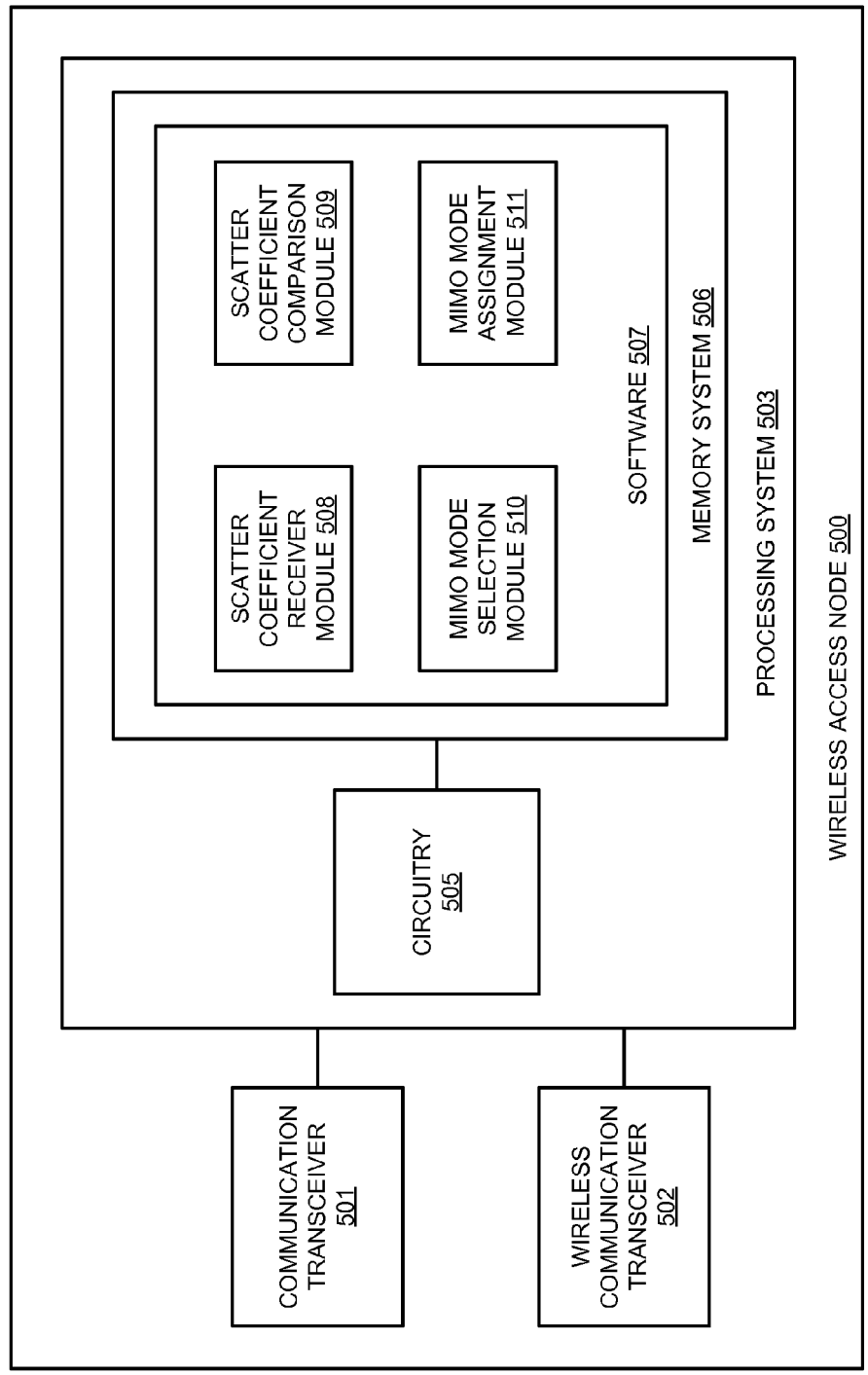
FIG. 5 is a block diagram that illustrates a wireless access node.

FIG. 5 is a block diagram that illustrates wireless access node 500. Wireless access node 500 provides an example of wireless access node 110, although node 110 may have alternative configurations. Wireless access node 500 comprises communication transceiver 501, wireless communication transceiver 502, and processing system 503. Processing system 503 is linked to communication transceiver 501 and wireless communication transceiver 502. Processing system 503 includes processing circuitry 505 and memory system 506 that stores operating software 507. Operating software 507 comprises software modules 508-511.

Communication transceiver 501 comprises components that communicate over communication links, such as network cards, ports, RF transceivers, processing circuitry and software, or some other communication components. Communication transceiver 501 may be configured to communicate over metallic, wireless, or optical links. Communication transceiver 501 may be configured to use TDM, IP, Ethernet, optical networking, wireless protocols, communication signaling, or some other communication format—including combinations thereof.

Wireless communication transceiver 502 comprises RF communication circuitry and an antenna. The RF communication circuitry typically includes an amplifier, filter, RF modulator, and signal processing circuitry. Wireless communication transceiver 502 may also include a memory system, software, processing circuitry, or some other communication device. Wireless communication transceiver 502 may use various protocols, such as CDMA, GSM, UMTS, HSPA, EV-DO, EV-DO rev. A, B, and C, 3GPP LTE, WiMAX, Wi-Fi, Bluetooth, Internet, telephony, or some other wireless communication format. Wireless communication transceiver 502 could be configured to receive a scattering coefficient transmitted from a wireless communication device served by wireless access node 500.

Processing circuitry 505 comprises microprocessor and other circuitry that retrieves and executes operating software 507 from memory system 506. Processing circuitry 505 may comprise a single device or could be distributed across multiple devices—including devices in different geographic areas. Processing circuitry 505 may be embedded in various types of equipment. Memory system 506 comprises a non-transitory computer readable storage medium, such as a disk drive, flash drive, data storage circuitry, or some other hardware memory apparatus. Memory system 506 may comprise a single device or could be distributed across multiple devices—including devices in different geographic areas. Memory system 506 may be embedded in various types of equipment. In some examples, a computer apparatus could comprise memory system 506 and operating software 507. Operating software 507 comprises computer programs, firmware, or some other form of machine-readable processing instructions. Operating software 507 may include an operating system, utilities, drivers, network interfaces, applications, or some other type of software. In this example, operating software 507 comprises software modules 508-511, although software 507 could have alternative configurations in other examples.

When executed by circuitry 505, operating software 507 directs processing system 503 to operate as described herein for wireless access node 110. In particular, operating software 507 may direct processing system 503 to direct wireless communication transceiver 502 to receive a scattering coefficient transmitted from a wireless communication device served by wireless access node 500. Operating software 507 directs processing system 503 compare the scattering coefficient to a scattering threshold. Operating software 507 further directs processing system 503 to, if the scattering coefficient exceeds the scattering threshold, select a lower order MIMO mode for the wireless communication device. Finally, operating software 507 directs processing system 503 to assign the lower order MIMO mode to the wireless communication device.

In this example, operating software 507 comprises a scatter coefficient receiver software module 508 that receives a scattering coefficient transmitted from a wireless communication device served by wireless access node 500. In addition, operating software 507 comprises a scatter coefficient comparison software module 509 that compares the scattering coefficient to a scattering threshold. Operating software 507 also comprises a MIMO mode selection software module 510 that selects a lower order MIMO mode for the wireless communication device if the scattering coefficient exceeds the scattering threshold. Finally, operating software 507 comprises a MIMO mode assignment software module 511 that assigns the lower order MIMO mode to the wireless communication device.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless access node to facilitate dynamic assignment of multiple-input multiple-output (MIMO) modes, the method comprising:
   receiving a scattering coefficient transmitted from a wireless communication device served by the wireless access node;
   comparing the scattering coefficient to a scattering threshold;
   if the scattering coefficient exceeds the scattering threshold, selecting a lower order MIMO mode comprising a one by one MIMO mode for the wireless communication device; and
   assigning the lower order MIMO mode to the wireless communication device.

2. The method of claim 1 further comprising, if the scattering coefficient falls below the scattering threshold, selecting a MIMO mode for the wireless communication device based on a channel quality indicator.

3. The method of claim 1 wherein the scattering coefficient represents a degree of scattering present at a location of the wireless communication device.

4. The method of claim 1 further comprising receiving a new scattering coefficient transmitted from the wireless communication device, and if the new scattering coefficient falls below the scattering threshold, assigning a higher order MIMO mode to the wireless communication device.

5. The method of claim 4 wherein the higher order MIMO mode comprises a four by four MIMO mode.

6. A wireless access node to facilitate dynamic assignment of multiple-input multiple-output (MIMO) modes, the wireless access node comprising:
   a wireless communication transceiver configured to receive a scattering coefficient transmitted from a wireless communication device served by the wireless access node; and
   a processing system configured to compare the scattering coefficient to a scattering threshold, and if the scattering coefficient exceeds the scattering threshold, select a lower order MIMO mode comprising a one by one MIMO mode for the wireless communication device and assign the lower order MIMO mode to the wireless communication device.

7. The wireless access node of claim 6 wherein the processing system is further configured to, if the scattering coefficient falls below the scattering threshold, select a MIMO mode for the wireless communication device based on a channel quality indicator.

8. The wireless access node of claim 6 wherein the scattering coefficient represents a degree of scattering present at a location of the wireless communication device.

9. The wireless access node of claim 6 wherein the wireless communication transceiver is further configured to receive a new scattering coefficient transmitted from the wireless communication device, and wherein the processing system is further configured to, if the new scattering coefficient falls below the scattering threshold, assign a higher order MIMO mode to the wireless communication device.

10. The wireless access node of claim 9 wherein the higher order MIMO mode comprises a four by four MIMO mode.

11. A computer apparatus to facilitate dynamic assignment of multiple-input multiple-output (MIMO) modes, the apparatus comprising:
   software instructions configured, when executed by a wireless access node, to direct the wireless access node to receive a scattering coefficient transmitted from a wireless communication device served by the wireless access node, compare the scattering coefficient to a scattering threshold, and if the scattering coefficient exceeds the scattering threshold, select a lower order MIMO mode comprising a one by one MIMO mode for the wireless communication device and assign the lower order MIMO mode to the wireless communication device; and at least one non-transitory computer-readable storage medium storing the software instructions.

12. The computer apparatus of claim 11 further comprising the software instructions configured to direct the wireless access node to, if the scattering coefficient falls below the scattering threshold, select a MIMO mode for the wireless communication device based on a channel quality indicator.

13. The computer apparatus of claim 11 wherein the scattering coefficient represents a degree of scattering present at a location of the wireless communication device.

14. The computer apparatus of claim 11 further comprising the software instructions configured to direct the wireless access node to receive a new scattering coefficient transmitted from the wireless communication device, and if the new scattering coefficient falls below the scattering threshold, assign a higher order MIMO mode to the wireless communication device.

* * * * *